United States Patent

Wessels et al.

[11] Patent Number: 5,969,599
[45] Date of Patent: Oct. 19, 1999

[54] RESTRAINT DEPLOYMENT CONTROL METHOD HAVING AN ADAPTABLE DEPLOYMENT THRESHOLD

[75] Inventors: Gerhard F. Wessels, Haan, Germany; Joseph Thomas Dalum, Noblesville, Ind.

[73] Assignee: Delco Electronics Corp., Kokomo, Ind.

[21] Appl. No.: 09/188,988

[22] Filed: Nov. 9, 1998

[51] Int. Cl.$^6$ .................................................. B60Q 1/00
[52] U.S. Cl. ........................ 340/436; 340/903; 307/10.1; 701/45; 280/735; 180/282
[58] Field of Search ..................... 340/436, 435, 340/901, 903, 904; 307/10.1; 701/45; 280/735; 180/282, 273

[56] References Cited

U.S. PATENT DOCUMENTS

| | | | |
|---|---|---|---|
| 5,424,583 | 6/1995 | Spies et al. | 307/10.1 |
| 5,493,493 | 2/1996 | Shibata et al. | 307/10.1 |
| 5,508,918 | 4/1996 | Gioutsos | 340/436 |
| 5,737,224 | 4/1998 | Jeenicke et al. | 307/10.1 |
| 5,777,225 | 7/1998 | Sada et al | 701/70 |
| 5,801,619 | 9/1998 | Liu et al. | 340/436 |
| 5,802,480 | 9/1998 | Shiraishi | 701/45 |
| 5,884,203 | 3/1999 | Ross | 701/45 |

*Primary Examiner*—Nina Tong
*Attorney, Agent, or Firm*—Jimmy L. Funke

[57] ABSTRACT

An improved deployment method for a vehicular supplemental restraint system having an acceleration sensor and a restraint device to be deployed for occupant protection in a crash event, where the deployment is initiated when a filtered version of the acceleration signal exceeds a deployment threshold that is periodically adjusted based on one or more secondary measures of crash severity and the level of event progression, the level of event progression being based on the value of a filtered acceleration signal relative to one or more predefined event progression thresholds. The deployment threshold is set to a relatively high default level during periods of inactivity to provide good immunity to rough road impacts, while providing timely deployment for high speed crash events, and is periodically adjusted from the default level in the course of a crash event. Preferably, the level of event progression is determined by deriving a delta-velocity signal biased toward zero, and comparing such signal to a set of predefined event progression thresholds. At each level or stage of the event progression, the deployment threshold is adjusted within predefined boundaries based on one or more secondary measures of crash severity. Threshold adjustments based on each of the secondary measurements are weighted and accumulated to determine the net threshold adjustment.

12 Claims, 3 Drawing Sheets

5,969,599

RESTRAINT DEPLOYMENT CONTROL METHOD HAVING AN ADAPTABLE DEPLOYMENT THRESHOLD

This invention relates to automotive passenger restraint systems, and more particularly to a control method that differentiates deployment events from non-deployment events.

BACKGROUND OF THE INVENTION

In general, automotive passenger restraint systems perform a number of functions including acceleration sensing, signal processing and analysis, and deployment of one or more restraint devices such as frontal or side air bags and seat belt pretensioners in response to a sensed crash event. Typically, the acceleration signal is monitored to detect a potential crash event, and then filtered or integrated over the course of the crash event to produce a velocity change or $\Delta V$ signal. If the $\Delta V$ signal exceeds a threshold, the crash event is determined to be sufficiently severe to warrant deployment of restraints. The threshold is typically time-dependent, and is calibrated based on data logged for different types of crash events, as well as data logged during rough road driving.

A problem with the above-described approach is that it is often difficult to synchronize the time progression of the crash (that is, the event clock or timer) with the actual crash event. Various algorithms have been developed for determining if and when the event clock should be reset to improve synchronization. As a result, it can be difficult to distinguish between deployment events and non-deployment events, particularly in the first portion of the sensed event.

SUMMARY OF THE PRESENT INVENTION

The present invention is directed to an improved deployment method for a vehicular supplemental restraint system having an acceleration sensor and a restraint device to be deployed for occupant protection in a crash event, where the deployment is initiated when a filtered version of the acceleration signal exceeds a deployment threshold that is periodically adjusted based on one or more secondary measures of crash severity and the level of event progression, the level of event progression being based on the value of a $\Delta V$ signal relative to one or more predefined event progression thresholds.

In a preferred embodiment, the deployment threshold is set to a relatively high default level during periods of inactivity to provide good immunity to rough road impacts, while providing timely deployment for high speed crash events, and is periodically adjusted from the default level in the course of a sensed event. Preferably, the level of event progression is determined by deriving a $\Delta V$ signal biased toward zero, and comparing such signal to a set of pre-defined event progression thresholds. At each level or stage of the event progression, the deployment threshold is adjusted within predefined boundaries based on one or more secondary measures of crash severity. Threshold adjustments based on each of the secondary measurements are weighted and accumulated to determine the net threshold adjustment. In one particularly advantageous embodiment, the secondary measurements include a soft impact index based on the difference between the cumulative change in filtered acceleration over a predefined window, and the slope of the cumulative change signal. The secondary measurements may also or alternatively be based on inputs from other sensors, such as lateral acceleration sensors, remote longitudinal acceleration sensors, or impact sensors.

BRIEF DESCRIPTION OF THE DRAWINGS

FIG. 3 is a main flow diagram, and FIG. 4 details a step of the main flow diagram relating to determination of a threshold adaptation amount.

DETAILED DESCRIPTION OF THE DRAWINGS

Figure 1:
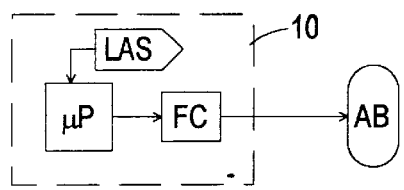
FIG. 1 is a schematic diagram of a supplemental restraint system including a programmed microprocessor for carrying out the deployment method of this invention.

FIG. 1 generally depicts a vehicle supplemental restraint system in which one or more restraints, such as air bags AB, are deployed in a severe crash event to protect the vehicle occupants. The restraints may include without limitation, air bags, belt pretensioners, inflatable tubular structures, side curtains, anti-whiplash devices, etc., and it will be understood that such term AB as used herein does not refer exclusively to a particular type of restraint. A deployment control system, designated generally by the reference numeral 10, may be packaged as a single electronic module and mounted on a frame element in a central portion of the vehicle. Fundamentally, the system 10 includes a longitudinal acceleration sensor LAS (which may comprise a single sensor or a pair of sensors mounted at an offset angle) for sensing longitudinal acceleration of the vehicle, a microprocessor $\mu P$ for receiving the output signal of longitudinal acceleration sensor LAS, and a firing circuit FC which is triggered by microprocessor $\mu P$ to deploy the air bags AB in the event of a severe crash. In general, the microprocessor $\mu P$ filters the longitudinal acceleration signal over a predefined interval, or window, to form a windowed velocity signal, referred to herein as $\Delta V_{WIN}$. The microprocessor $\mu P$ then adjusts a deployment threshold, referred to herein as a $\Delta V$ Threshold, based on event progression and secondary crash criteria, and compares $\Delta V_{WIN}$ to the $\Delta V$ Threshold. If $\Delta V_{WIN}$ crosses the $\Delta V$ Threshold, the microprocessor $\mu P$ signals the firing circuit FC to deploy the air bags AB.

According to the present invention, the $\Delta V$ Threshold is set at a default level prior to initiation of a crash event and is periodically adjusted during the crash event based on a measure of event progression and one or more secondary measures of crash severity, generally referred to herein as $\Delta V_{sec}$. The progression of the sensed event is determined by a $\Delta$ velocity-based signal designed to reject low acceleration noise due to road surface irregularities, and the secondary measures are designed to identify the characteristics of various types of crash events so that the $\Delta V$ Threshold can be adjusted accordingly.

The windowed velocity signal $\Delta V_{WIN}$ may be calculated according to the expression:

$$\Delta V_{WIN}(n) = \Sigma[\text{ACCEL}(n-i)], \text{ for } i=0 \text{ to } (w-1) \qquad (1)$$

where ACCEL is a filtered version of the output of acceleration sensor LAS and w is the window size. In a digital implementation, the window w actually refers to a specified number of successive samples of the acceleration signal. Since the samples are read at a predefined rate, however, the window w also may be viewed as a corresponding time interval.

In the preferred embodiment, the level of event progression is determined by computing a velocity signal $\Delta V_{bias}$ that is biased toward zero. The biased velocity signal $\Delta V_{bias}$ may be determined by computing a filtered acceleration signal $\Delta V$, and then applying a bias "B". For example, $\Delta V$ may be calculated according to the expression:

$$\Delta V(n) = \Delta V(n-1) + ACCEL(n) - \Delta V(n-1)/C \quad (2)$$

where C is a constant, with $\Delta V bias$ being defined as:

$$\Delta V_{bias} = \Delta V - B \quad (3)$$

and the bias B being defined as:

$$B = \begin{array}{ll} d & \text{if } \Delta V > d, \text{ with } d \text{ being a positive integer} \\ \Delta V & \text{if } |\Delta V| \leq d \\ -d & \text{if } \Delta V < -d \end{array} \quad (4)$$

Figure 2:
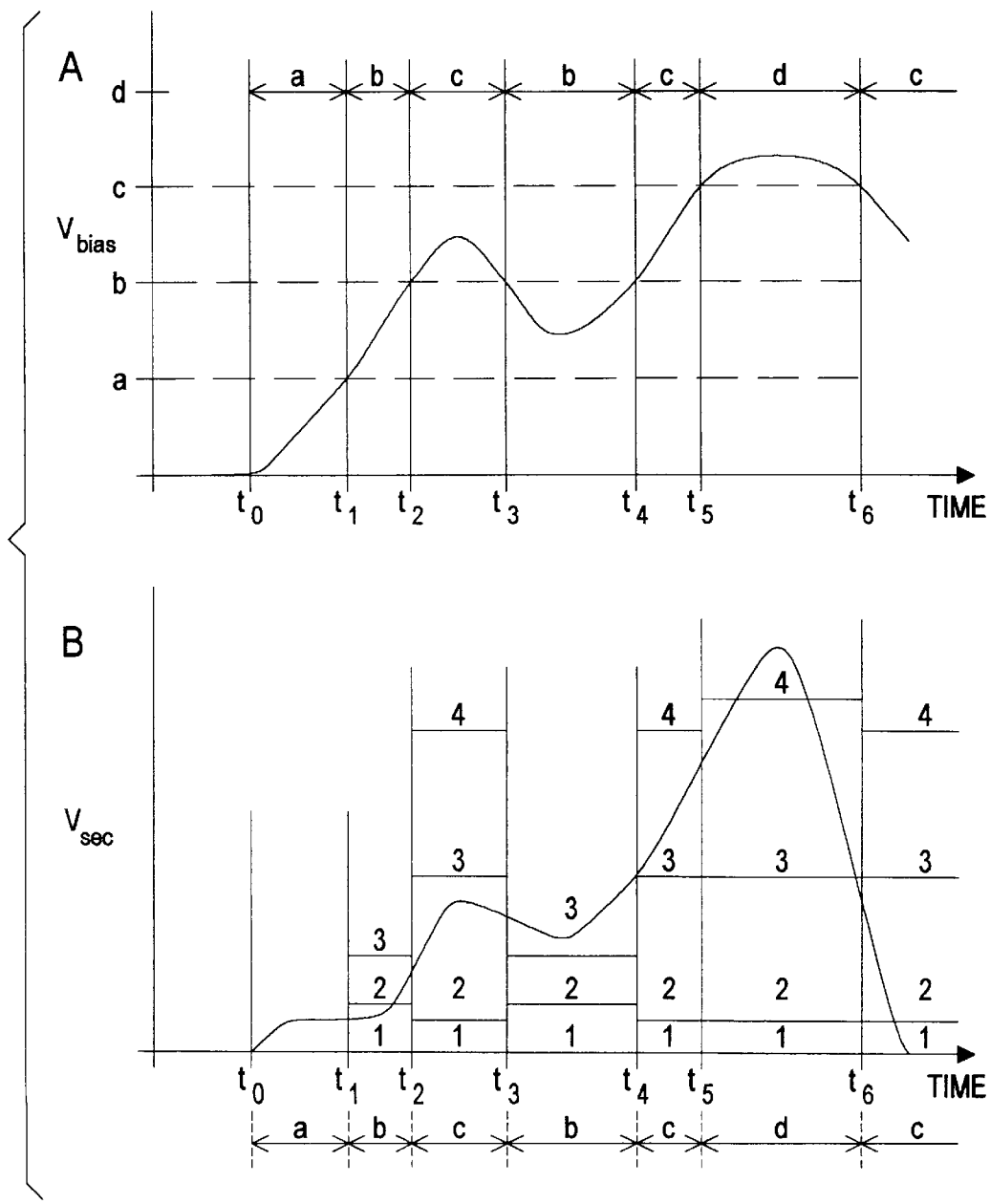
FIG. 2 is a graphical representation of event progression determination and threshold modification according to this invention.

Alternatively, the level of event progression can be determined by using windowed velocity $\Delta V_{WIN}$ within a limited acceleration range, or a filtered version of $\Delta V_{WIN}$ or $\Delta V$. For purposes of this description, however, it will be assumed that $\Delta V_{bias}$ is used to determine the level of event progression. To this end, $\Delta V_{bias}$ is compared to a series of predefined velocity values, referred to herein as progression level thresholds a–d, thereby defining four corresponding stages or levels of event progression; obviously, the number of thresholds, and hence progression levels, may vary from one implementation to another. The approach is graphically depicted in FIG. 2, where Graphs A and B show exemplary values of $\Delta V_{bias}$ and a secondary measurement term $\Delta V_{sec}$ respectively, on a common time scale. The time designations $t_0$–$t_6$ signify times that coincide with $\Delta V_{bias}$ crossing one of the thresholds a–d, and the event progression level at any given time is indicated at the top of Graph A, and below the time axis of Graph B. For example, progression level of the sensed event is "a" in the time interval $t_0$–$t_1$, "b" in the time interval $t_1$–$t_2$, "c" in the time interval $t_2$–$t_3$, "b" in the time interval $t_3$–$t_4$, and so on. The progression level "a" is indicative of no or very low activity. For each secondary measure $\Delta V_{sec}$, each of the progression levels a–d have predefined regions corresponding to different levels of the secondary measure, as shown by the vertical columns in Graph B, and the threshold adjustment amount is determined based on which region the secondary signal is in. For example, if the sensed event in is progression level "b", a set of threshold adjustment rules might be: (1) increase the $\Delta V$ Threshold by 5 counts if $\Delta V_{sec}$ is in region 1, (2) increase the $\Delta V$ Threshold by 1 counts if $\Delta V_{sec}$ is in region 2, and (3) decrease the $\Delta V$ Threshold by 2 counts if $\Delta V_{sec}$ is in region 3.

The usefulness of the above-described threshold adjustment technique can be illustrated by considering an example. Suppose it is determined through review of crash data that a certain type of non-deployment event such as a low speed full frontal crash is characterized by high gradient of $\Delta V_{bias}$ at early and middle levels of the event progression. In such case, the progression levels a–d and the associated regions of secondary measurement representing high gradient of $\Delta V_{bias}$ can be determined by statistical analysis, and used to formulate rules such as described above to raise the $\Delta V$ Threshold when the event progression level and secondary measurement characteristics are recognized in the course of a crash event so as to reduce the likelihood of an unwanted deployment. As a practical matter, there may be several secondary measurements, based on the longitudinal acceleration signal ACCEL, or on signals from other sensors such as a lateral acceleration sensor, a remote longitudinal acceleration sensor, or an intrusion sensor. In any event, the threshold adjustments associated with each such secondary measurement are summed to form a net adjustment value. If desired, weighting may be used to give more effect to adjustments associated with secondary measurement characteristics that are easily recognized, as compared to characteristics that tend to be variable and are less easily recognized.

In a particularly advantageous embodiment, the secondary measurements include a Soft Impact (SI) Index based on the difference between a first signal, referred to herein as the $\Delta\Delta V$ signal, and a second signal, referred to herein as the $\Delta\Delta V_{slope}$ signal. The $\Delta\Delta V$ signal represents the cumulative change in the filtered acceleration ($\Delta V$) signal over a predefined window, and the $\Delta\Delta V_{slope}$ signal represents the current slope of the $\Delta\Delta V$ signal. The filtered acceleration (i.e., the $\Delta V$ signal) may be calculated as set forth above in equation (2) or alternately, according to the expression:

$$\Delta V(n) = \Sigma[c(i)*ACCEL(n-i)], \text{ for } i=0 \text{ to } (w_0\text{-}1) \quad (5)$$

where ACCEL is the acceleration signal output of acceleration sensor LAS, c is a filter coefficient, and $w_0$ is the window size. The cumulative change in $\Delta V$ over the window $w_1$ (i.e., the $\Delta\Delta V$ signal) may be calculated according to the expression:

$$\Delta\Delta V(n) = \Sigma[\Delta V(n-i) - \Delta V(n-x)], \text{ for } i=0 \text{ to } x \quad (6)$$

where $x=w_1-1$. The change in $\Delta\Delta V$ over the window $w_2$ (i.e., the $\Delta\Delta V_{slope}$ signal) may be calculated according to the expression:

$$\Delta\Delta V_{slope}(n) = \Delta\Delta V(n) - \Delta\Delta V(n-y) \quad (7)$$

where $y=W_2-1$. Finally, the SI Index is calculated according to the expression:

$$\text{SI Index}(n) = |\Delta\Delta V(n) - \Delta\Delta V_{slope}(n)| \quad (8)$$

The merit of the SI Index is that it helps distinguish between deployment events such as a high speed impact with a deformable barrier and non-deployment events such as gravel pile impacts and low speed frontal collisions. At the beginning of a crash event when the $\Delta V$ signal is low, the $\Delta\Delta V$ signal tracks the $\Delta\Delta V_{slope}$ signal until the trailing portion of the rising $\Delta\Delta V$ signal falls outside the slope measurement window $w_2$. The $\Delta\Delta V_{slope}$ signal then typically falls off relative to the $\Delta\Delta V$ signal, giving rise to the SI Index. Low energy impacts having a soft onset, such as an impact with a gravel pile or a low speed full frontal impact, will produce a relatively high SI Index in the early progression of the sensed event, whereas high speed impacts that require deployment will produce a relatively low SI Index in the early progression of the sensed event. As a secondary measure, the SI Index is used, solely or along with other secondary measures, to adjust the $\Delta V$ Threshold. If the crash event is characterized by a relatively high value of the SI Index in the early progression levels of the sensed event (progression levels b–c, for example), the $\Delta V$ Threshold is increased to increase immunity to rough road and low velocity impacts. On the other hand, if the crash event is characterized by a relatively low value of the SI Index early in the progression level of the sensed event, the $\Delta V$ Threshold is lowered to provide faster deployment in high speed crash events.

Figure 3:
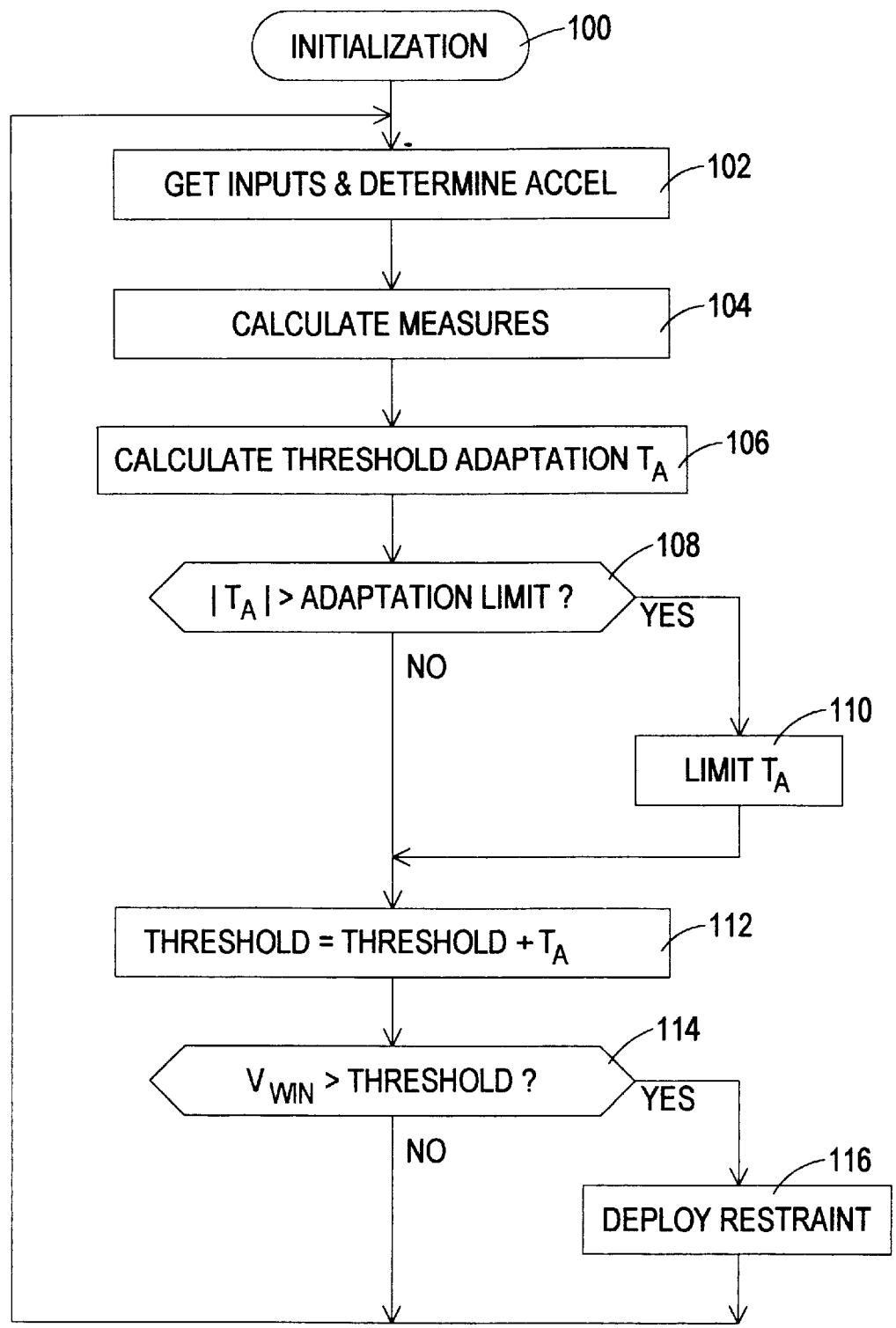
FIGS. 3–4 are flow diagrams representative of computer program instructions executed by the microprocessor of FIG. 1 in carrying out the deployment method of this invention.
Figure 4:
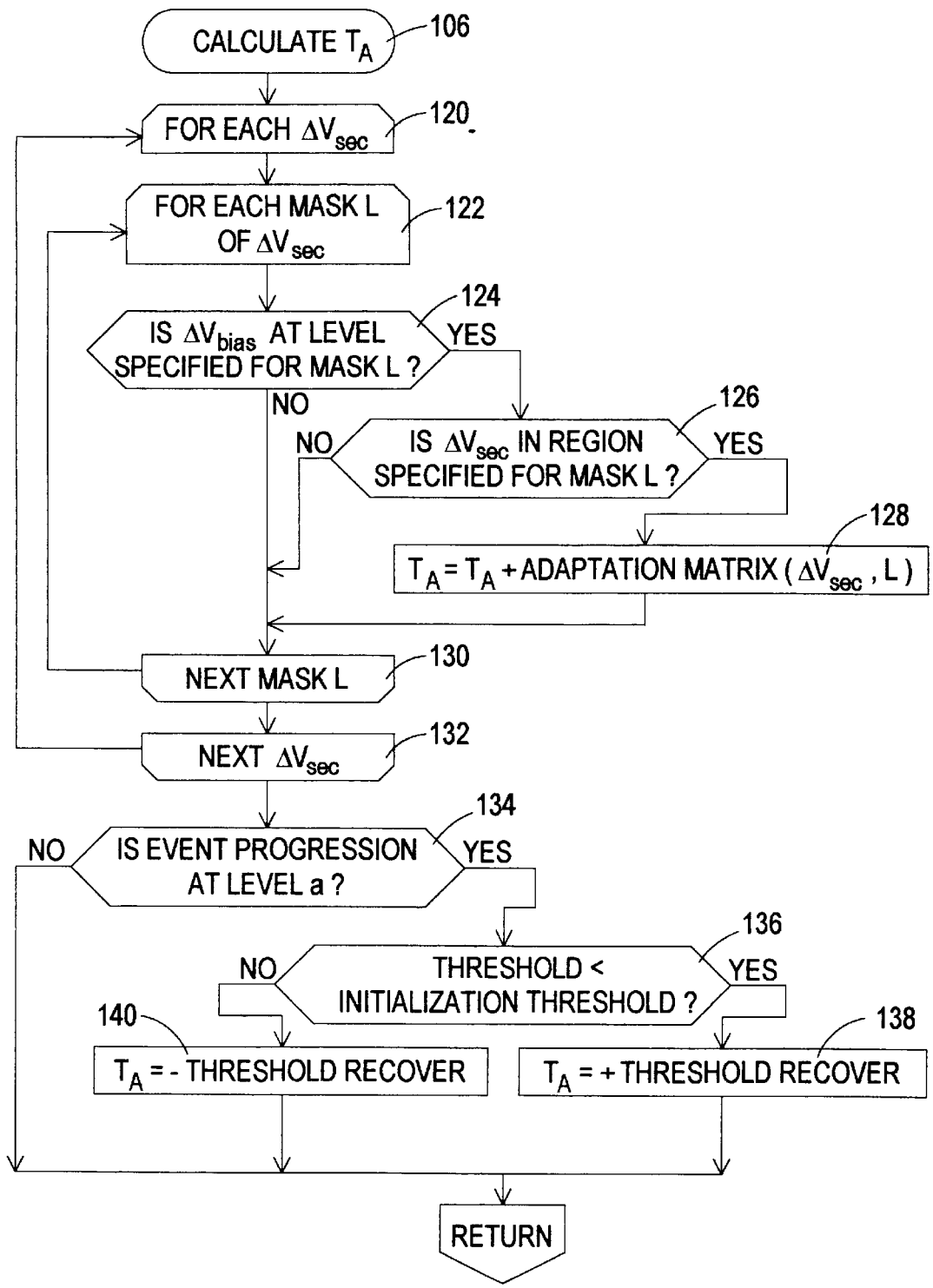

A flow diagram representative of computer program instructions executed by the microprocessor $\mu P$ of FIG. 1 in carrying out the above-described deployment method is set forth in FIGS. 3–4. FIG. 3 depicts a main loop flow diagram, where the block 100 designates a series of instructions executed at the initiation of vehicle operation for initializing various registers, counters, flags and variables to a predefined state. For example, the ΔV Threshold is initialized to a default value at this point. Thereafter, the block 102 is executed to read the output signal of the longitudinal acceleration sensor LAS, and to filter it to form a filtered acceleration signal ACCEL. The various severity measurements are then computed at block 104; these include, for example, ΔV, $\Delta V_{bias}$, $\Delta V_{win}$, $V_{sec1}$, $V_{sec2}$, and so on, where $V_{sec1}$ and $V_{sec2}$ are secondary measurements such as the SI Index or a $\Delta V_{bias}$ gradient measurement. Block 106 is then executed to determine a net threshold adaptation amount $T_A$, as described in detail below in reference to FIG. 4. If the magnitude of the determined adaptation amount $T_A$ is greater than a limit value, as determined at block 108, the block 110 is executed to suitably limit adaptation amount $T_A$. Then, the adaptation amount $T_A$ (which can be either positive or negative) is added to the ΔV Threshold at block 112. If the windowed velocity $\Delta V_{win}$ exceeds the newly adjusted threshold, as determined at block 114, the block 116 is executed to deploy the restraints AB.

The flow diagram of FIG. 4 sets forth the main flow diagram step of determining the net threshold adaptation amount $T_A$ (block 106) in further detail. In the illustrated embodiment, the various event progression thresholds a–d, the regions 1–4 for each secondary measurement, and the associated threshold adjustment amounts are stored in an adaptation matrix within microprocessor μP, and a series of progression level masks for each secondary measurement are used to identify corresponding regions and adjustment amounts $T_A$. Blocks 120–132 comprise a nested loop for determining the net threshold adaptation amount $T_A$, taking into account each of the secondary measurements. Thus, for each secondary measurement $\Delta V_{sec}$, the microprocessor μP executes the blocks 122–130 within the $\Delta V_{sec}$ loop boundary blocks 120 and 132, and for each progression level mask L, the microprocessor μP executes the blocks 124–128 within the progression level loop boundary blocks 122 and 130. At block 124, the current mask L is applied to the matrix, and the microprocessor μP determines if the biased velocity $\Delta V_{bias}$ is within the corresponding progression level thresholds. If not, the mask L for the next progression level is applied to the matrix, as indicated at block 130. If $\Delta V_{bias}$ is within the corresponding progression level thresholds, block 126 determines if the respective secondary measurement $\Delta V_{sec}$ is within an adaptation region corresponding to the progression level of the mask L, and if so, block 128 adds the corresponding adaptation value to the net threshold adaptation amount $T_A$. As indicated at block 128, the adaptation value is stored in the matrix as a function of the secondary measurement $\Delta V_{sec}$ and the progression level mask L.

After the net threshold adaptation amount $T_A$ is determined for each progression level mask L of each secondary measurement $\Delta V_{sec}$, the blocks 134–138 are executed to bias the ΔV Threshold toward its default value (initialization threshold) if the event progression level is "a"—i.e., no activity. Block 134 determines if the event progression is at level "a". If so, block 136 compares the ΔV Threshold to the Initialization Threshold. If the ΔV Threshold has been adjusted to a value less than the Initialization Threshold, block 138 sets the net threshold adaptation amount $T_A$ to a positive incremental value, referred to in FIG. 4 as + Threshold Recover. Conversely, if the ΔV Threshold has been adjusted to a value greater than the Initialization Threshold, block 138 sets the net threshold adaptation amount $T_A$ to a negative incremental value, referred to in FIG. 4 as – Threshold Recover.

In summary, the deployment method of this invention provides a flexible framework for providing a high level of immunity to spurious acceleration signals and distinguishing between deployment events and non-deployment events without the crash synchronization problems associated with time dependent ΔV thresholds. The statistical frequency of various secondary measurements for different types of crash events (i.e., deployment, non-deployment, rough road, etc.) can be characterized as a function of ΔV-based event progression level, and used to suitably adjust the ΔV Threshold to increase or decrease the likelihood of deployment in the course of a crash event. When the crash event is over, the threshold is biased back to an initialization or default level providing the desired immunity to spurious events. While described in reference to the illustrated embodiment, it is expected that various modifications in addition to those suggested above will occur to those skilled in the art. In this regard, it will be understood that this invention is not limited to the illustrated embodiment, and that deployment methods incorporating such modifications may fall within the scope of this invention, which is defined by the appended claims.

The embodiments of the invention in which an exclusive property or privilege is claimed are defined as follows:

1. In a vehicular supplemental restraint system having a sensor providing a vehicle acceleration signal, a restraint device and a controller for deploying the restraint device for vehicle occupant protection in a crash event when a measure of crash severity based on the acceleration signal exceeds a deployment threshold, the improvement wherein the controller:

initializes the deployment threshold at a default level prior to the crash event;

determines an event progression signal during the crash event based on the acceleration signal;

determines at least one secondary measure of crash severity during the crash event; and periodically adjusts the deployment threshold based on the determined secondary measure and a magnitude of the determined event progression signal relative to one or more predefined event progression thresholds.

2. The improvement of claim 1, wherein the controller biases the deployment threshold to the default level after the crash event.

3. The improvement of claim 1, wherein the controller determines the event progression signal by filtering the acceleration signal, and biasing the filtered acceleration signal toward zero.

4. The improvement of claim 1, wherein the controller determines the at least one secondary measure of crash severity by:

filtering the acceleration signal;

determining a cumulative change in the filtered acceleration signal over a predefined interval; and computing a difference between the determined cumulative change and a slope of the determined cumulative change.

5. The improvement of claim 1, wherein the deployment threshold is adjusted by a predefined threshold adjustment value selected as a function of the magnitude of the determined secondary measure relative to one or more predefined secondary measurement thresholds.

6. The improvement of claim 5, wherein there are a plurality of secondary measures of crash severity, and the controller:

sums threshold adjustment values selected for each of the plurality of secondary measures to form a net threshold adjustment value;

limits the net threshold adjustment value to a predefined limit value; and adjusts the deployment threshold in accordance with the limited net threshold adjustment value.

7. A control method for a vehicular supplemental restraint system having a sensor providing a vehicle acceleration signal, a restraint device that can be deployed in a crash event for vehicle occupant protection, the method comprising the steps of:

initializing a deployment threshold at a default level prior to the crash event;

determining an event progression signal during the crash event based on the acceleration signal;

determining at least one secondary measure of crash severity during the crash event;

periodically adjusting the deployment threshold during the crash event based on the determined secondary measure and a magnitude of the determined event progression signal relative to one or more predefined event progression thresholds; and deploying the restraint device when a measure of crash severity based on the acceleration signal exceeds the development threshold.

8. The control method of claim 7, including the step of progressively returning the deployment threshold to the default level after the crash event.

9. The control method of claim 7, wherein the step of determining the event progression signal includes the steps of:

filtering the acceleration signal; and biasing the filtered acceleration signal toward zero.

10. The control method of claim 7, wherein the step of determining at least one secondary measure of crash severity includes the steps of:

filtering the acceleration signal;

determining a cumulative change in the filtered acceleration signal over a predefined interval; and determining the at least one secondary measure of crash severity according to a difference between the determined cumulative change and a slope of the determined cumulative change.

11. The control method of claim 7, wherein the step of periodically adjusting the deployment threshold includes the steps of:

determining a threshold adjustment value based on a magnitude of the determined secondary measure; and adjusting the deployment threshold in accordance with the determined threshold adjustment value.

12. The control method of claim 11, wherein there are a plurality of secondary measures of crash severity, and the method includes the steps of:

summing threshold adjustment values determined for each of the plurality of secondary measures to form a net threshold adjustment value;

limiting the net threshold adjustment value to a predefined limit value; and adjusting the deployment threshold in accordance with the limited net threshold adjustment value.

\* \* \* \* \*